United States Patent
Reepschlager

(10) Patent No.: US 6,757,057 B2
(45) Date of Patent: Jun. 29, 2004

(54) METHOD AND SYSTEM FOR AUTOMATIC OPTICAL FIBER TYPE IDENTIFICATION

(75) Inventor: Paul M. Reepschlager, Nepean (CA)

(73) Assignee: Nortel Networks Limited, Montreal (CA)

( * ) Notice: Subject to any disclaimer, the term of this patent is extended or adjusted under 35 U.S.C. 154(b) by 484 days.

(21) Appl. No.: 09/824,779

(22) Filed: Apr. 4, 2001

(65) Prior Publication Data

US 2002/0145729 A1 Oct. 10, 2002

(51) Int. Cl.⁷ .............................................. G01N 21/00
(52) U.S. Cl. ..................................................... 356/73.1
(58) Field of Search ................ 356/73.1; 398/140–170; 359/333–342; 385/95–121; 250/227.12, 227.14

(56) References Cited

U.S. PATENT DOCUMENTS

| 4,870,269 | A | * | 9/1989 | Jeunhomme et al. | .. 250/227.12 |
| 5,291,013 | A | * | 3/1994 | Nafarrate et al. | ...... 250/227.14 |
| 6,687,426 | B1 | * | 2/2004 | May et al. | ..................... 385/15 |
| 2002/0118442 | A1 | * | 8/2002 | Ghera et al. | ................ 359/334 |

* cited by examiner

Primary Examiner—Tu T. Nguyen
(74) Attorney, Agent, or Firm—G. Ronald Bell & Associates

(57) ABSTRACT

The present invention provides a method and system for automatically identifying a fiber type in an optically amplified optical fiber span. Optical spectrum analyzers are employed in order to measure profiles of one or more amplifiers connected to the fiber span. These profiles are then manipulated in order to obtain a score for the fiber span. This score is then compared to known scores for various fiber types in order to make a determination of the fiber type in the span. The profiles being measured can be either of a span loss profile or a Raman gain profile. In the case of a Raman gain profile, a Raman pump laser is employed in the measurements. According to the present invention, it is possible to identify whether a hybrid splice exists within a particular fiber span. The present invention also permits an auto mapping of networks.

18 Claims, 2 Drawing Sheets

| FIBER TYPE | MINIMUM SCORE | TYPICAL SCORE | MAXIMUM SCORE |
|---|---|---|---|
| 1 | 0.9X | X | 1.1X |
| 2 | 0.9Y | Y | 1.1Y |
| 3 | 0.9Z | Z | 1.1Z |

METHOD AND SYSTEM FOR AUTOMATIC OPTICAL FIBER TYPE IDENTIFICATION

CROSS-REFERENCE TO RELATED APPLICATION

This application is related to the commonly assigned application Ser. No. 09/824,798, filed on same date herewith, by Paul Reepschlager and Patrick Pilot, entitled "Method and System for Automatic Raman Gain Control"

FIELD OF INVENTION

The present invention relates to the field of optical transmission of data, and relates specifically to metrics for the evaluation of transmission losses in optically amplified fiber optic cables.

BACKGROUND OF THE INVENTION

The telecommunications industry is experiencing an increased demand for bandwidth due to the convergence of Internet traffic and more traditional types of voice and data traffic. To meet this increased demand, industry is moving toward the use of fiber optic cables to be able facilitate handling such convergent traffic. Fiber optic cable is especially beneficial in long-distance cabling because it is lightweight compared to the more traditional copper cable. Fiber is also desirable because it is inexpensive, compact, reliable, and efficient. Fiber optic transmission systems provide inherent high power throughput.

A typical fiber optic cable is an amalgamation of different fiber types. Typically, one particular type of fiber will dominate the length of a span of fiber, while other types of fiber will constitute lesser lengths of the entire span. Each type of fiber has a distinct set of properties. When different fiber types are combined within a span, the properties of each of these fiber types must be considered when attempting to achieve a desired set of properties for the entire span of fiber.

In particular, if a large segment of foreign fiber has been incorporated into a fiber span, it is important to identify and confirm specifications of the loss properties of that foreign length of cable.

Prior art in-system span loss measurements have generally been limited to the gathering of mean power measurements at both a transmit amplifier output and at a receive amplifier input, the amplifiers being at either end of the span being measured. The power at the transmit amplifier is subtracted from the power at the receive amplifier to obtain a mean loss value for the fiber span. However, in certain applications, such as Raman amplification, the measurement of a mean span loss value is insufficient. In such cases, a complete mapping of the fiber loss profile across a desired frequency spectrum may be desired.

One manner of obtaining information regarding the loss profile of a fiber is to identify the fiber type. Specific knowledge of accurate specifications relating to the loss properties of each type of fiber within a span would permit estimation of the loss profile of a fiber span comprising different fiber types. However, such accurate specifications are not always available. In fact, fiber optic system administrators or manufacturers may inadvertently provide or obtain outdated or incorrect specifications relating to the properties and lengths of the fiber types comprised within a fiber optic span.

Consequently, prior art methods of fiber identification are unreliable to the extent that they depend on the questionable accuracy of the theoretical data upon which such a fiber identification is based. Therefore, a fiber optic system administrator may be required to estimate the actual information related to fiber types within a span, which may result in greater losses and inefficient signal transmission over the entire span.

SUMMARY OF INVENTION

It is an object of the present invention to provide a method and system for automatically identifying a fiber type in an optically amplified fiber span.

According to an aspect of the invention, there is provided a method of automatically identifying a fiber type in an optically amplified fiber optic span, said span having connected thereto a transmit amplifier, and a receive amplifier, said method comprising the steps of: obtaining a spectral power profile near each of said transmit amplifier and said receive amplifier; determining a score for said fiber span based on a spectral loss profile for said fiber span; and comparing said score with known identification scores in a lookup table in order to make a positive determination of the fiber type for the fiber span if the measured score matches a score in the table within a given tolerance.

According to another aspect of the invention, there is provided a method of automatically identifying a fiber type in an optically amplified fiber optic span, said span having connected thereto a transmit amplifier, and a receive amplifier, said method comprising the steps of: obtaining a first spectral profile near said receive amplifier; applying a Raman pump laser to said system; obtaining a second spectral profile near said receive amplifier after said step of applying the Raman pump laser; determining a score for said fiber span based on a Raman gain profile for said fiber span; and comparing said score with known identification scores in a lookup table in order to make a positive determination of the fiber type for the fiber span if the measured score matches a score in the table within a given tolerance.

According to a further aspect of the invention, there is provided a fiber type identification system for automatically identifying a fiber type in an optically amplifiable fiber optic span comprising: one or more optical spectrum analyzers for measuring a spectral profile near one or more amplifiers attached to said fiber optic span; a lookup table of known identification scores for each of a plurality of fiber types; means for calculating a score based on said profile measurements; and means for comparing said score to the known identification scores in the lookup table in conjunction with a given tolerance in order to identify the fiber type.

The present invention permits the identification of a fiber type in an active network, as opposed to relying on theoretical information that was obtained during passive testing of the individual network components. According to the present invention, it is also possible to identify whether a hybrid splice exists within a particular fiber span. Furthermore, the present invention permits mapping of the fiber types for each span within a fiber link. Consequently, an auto mapping of a network is possible, based on each of these link mappings.

BRIEF DESCRIPTION OF THE DRAWINGS

Embodiments of the present invention will be further described with reference to the accompanying drawings, in which.

DETAILED DESCRIPTION OF THE INVENTION

The present invention provides a method of automatically identifying a fiber type in an optically amplified span. The procedure for this automatic identification comprises two stages. In the first stage, a power profile for the span in question is calculated (at the transmit and receive amplifiers). In the second stage, a defined analysis strategy is applied on the profile information to identify the fiber type. Two embodiments (methods) will be presented which can be used in accordance with this two-stage procedure. The first embodiment relates to calculating a loss profile for the span, while the second relates to calculating a Raman gain profile for the span.

Figures 1, 2:
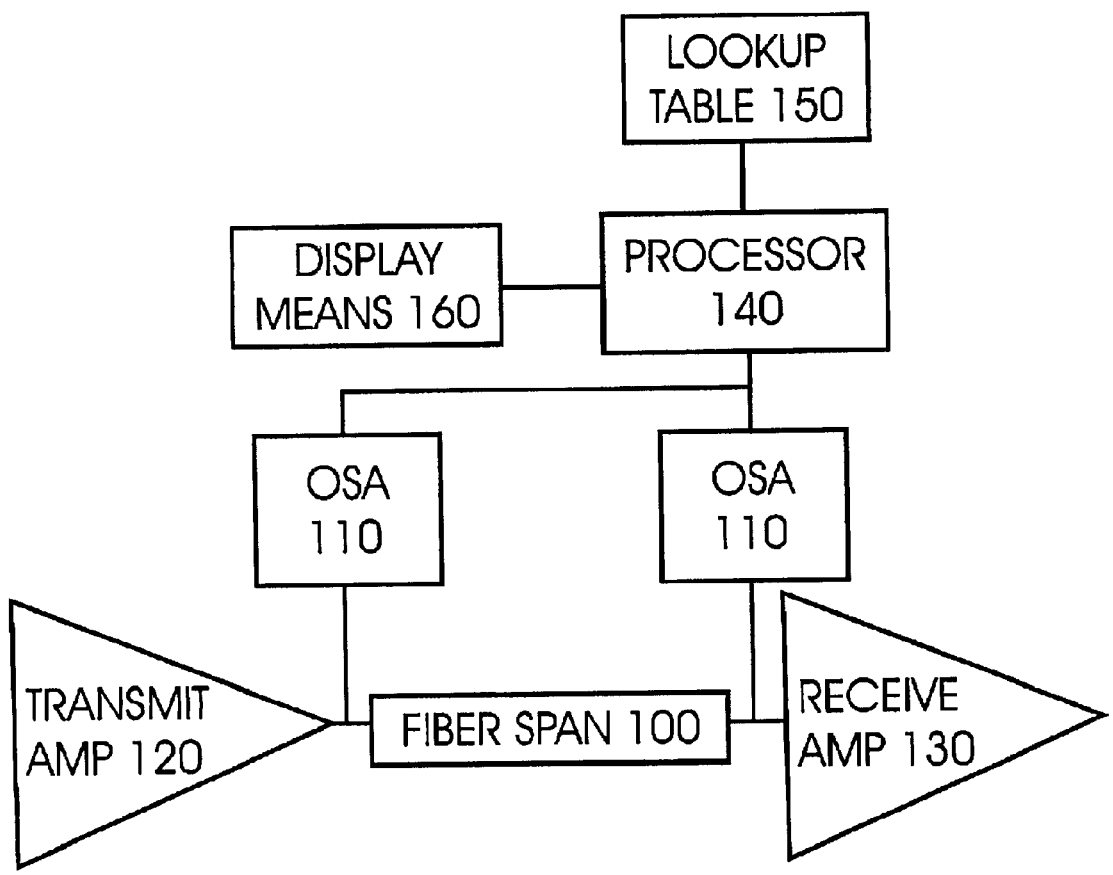
FIG. 1 illustrates diagrammatically a system for automatically identifying a fiber type according to an embodiment of the present invention.
FIG. 2 illustrates an example of a lookup table to be used in conjunction with an embodiment of the present invention.

FIG. 1 illustrates diagrammatically a system for automatically identifying a fiber type according to an embodiment of the present invention. As mentioned above, the first embodiment of the identification procedure involves calculating a span loss profile for a span 100 of a particular fiber type.

Cost effective optical spectrum analyzers (OSAs) 110 are employed to monitor the wavelength profile of transmit amplifier 120 and receive amplifier 130. If collected at a processor 140, these wavelength profiles may be utilized to derive the span loss profile, $L2(\lambda)$. In an embodiment of the present invention, the processor 140 is located at the receiving end of the span 100.

Measurement of the wavelength profiles is effected under system start-up conditions. The pumps at the transmit amplifier 120 are turned up to deliver high-power Amplified Spontaneous Emission (ASE) throughput. A transmit amplifier profile, $P1(\lambda)$, and a receive amplifier profile, $P3(\lambda)$, are then measured at the appropriate OSA 110.

The loss profile, $L2(\lambda)$, for the span 100 is then calculated at the processor 140 using:

$$L2(\lambda)=P3(\lambda)-P1(\lambda)$$

This loss profile may be calculated automatically based on the profile measurements by the processor 140, or by any other means capable of doing so. Alternatively, this calculation may be performed manually. Once this loss profile is calculated, the remaining step is to compare the measured loss profile with a catalog of known loss profiles for different types of fiber in order to determine which fiber type is being observed.

However, in order to perform this comparison, it is necessary to have a collection of fiber loss profiles for all fiber types that may be used in the span being measured. This collection may, for example, be restricted to the fiber types that are supported by a particular fiber optic product line. If such an appropriate collection of fiber loss profiles is not already available to the user of a system or method according to the present invention, these fiber loss profiles may be calculated as follows.

For each fiber type in a desired collection, a fiber loss profile measurement (such as has been described above) is performed. The loss profile measurements are focused only across a pre-defined window of wavelengths, typically corresponding with the wavelengths that will be used during operation of the fiber. The loss profile is then scaled with respect to a pre-defined value, such as the first blue wavelength. The result of this scaling will be a normalized distribution.

This normalized distribution will contain some relevant statistics, such as: $\Sigma$, the integral of all distribution values; $\mu$, the mean of the distribution; $\sigma$, the standard deviation of the distribution; Min, the minimum value of the distribution; Max, the maximum value of the distribution; and $\lambda 1$, the value measured at ONE identifying wavelength An analysis of these relevant statistics for each fiber type in the collection must be performed in order to determine a set of coefficients named A1 to A6. These coefficients are chosen such that a sufficient spread will exist between the indicator scores for each fiber type once a lookup table is constructed.

The sum of the statistical values above, weighted by appropriate pre-defined coefficients A1 to A6, is calculated according to the following equation:

$$Score = A1\cdot\Sigma + A2\cdot\mu + A3\cdot\sigma + A4\cdot min + A5\cdot Max + A6\cdot\lambda 1$$

The fiber identification score for each fiber type in the collection should then be tabulated and placed in a lookup table 150.

Once this lookup table 150 has been constructed, the system of the present invention may be employed in order to automatically identify the fiber type of the span 100. The system of the present invention compares the measured fiber loss profile (score) with the known fiber type indicators in the lookup table 150 to determine the fiber type. This comparison may be performed automatically by the processor 140, or by any other means capable of doing so. Alternatively, the comparison-may be performed manually.

If the measured score matches a score in the lookup table within a given tolerance, then a fiber type identification is positively made. However, if the measured score is outside of the given tolerance, then a fiber type identification is not positively made. In such a case, one can deduce that the fiber being measured has multiple fiber types which are spliced together, which itself is a very useful piece of information. Advantageously, the result of this comparison may be displayed on a display means 160.

FIG. 2 illustrates an example of a lookup table 150 in accordance with an embodiment of the present invention. This lookup table comprises the typical scores for three fiber types, along with an indication of the maximum and minimum scores, which define the boundaries of the tolerance for each score. This particular example illustrates the use of a uniform tolerance of +/−10% of the typical score. Thus, the minimum scores shown in FIG. 2 represent a value of 90% of the typical score, and the maximum scores shown represent a value of 110% of the typical score. Although this particular example has been provided, it will be evident to one skilled in the art that any suitable tolerance may be employed. As mentioned earlier, the coefficients, A1 to A6, should be chosen such that there is no overlap between the tolerance ranges for the different fiber types in the lookup table. With reference to FIG. 2, if the measured score is between the minimum and maximum score for one of the fiber types in the lookup table 150, the score is considered to be a match of that fiber type and the fiber is therefore identified.

The present invention employs statistical numbers related to the normalized distribution, rather than theoretical numbers, because it is not possible to truly define the existence of a "typical" profile for each fiber type. These statistical numbers related to the profiles provide better fingerprints, allowing for within-type fiber-to-fiber random differences on discrete wavelength measurements. The uniqueness of these statistics between fiber types will dictate the choice of weighting coefficient values, such that the sums of the products in the equation give a unique score for each fiber type.

Figure 3:
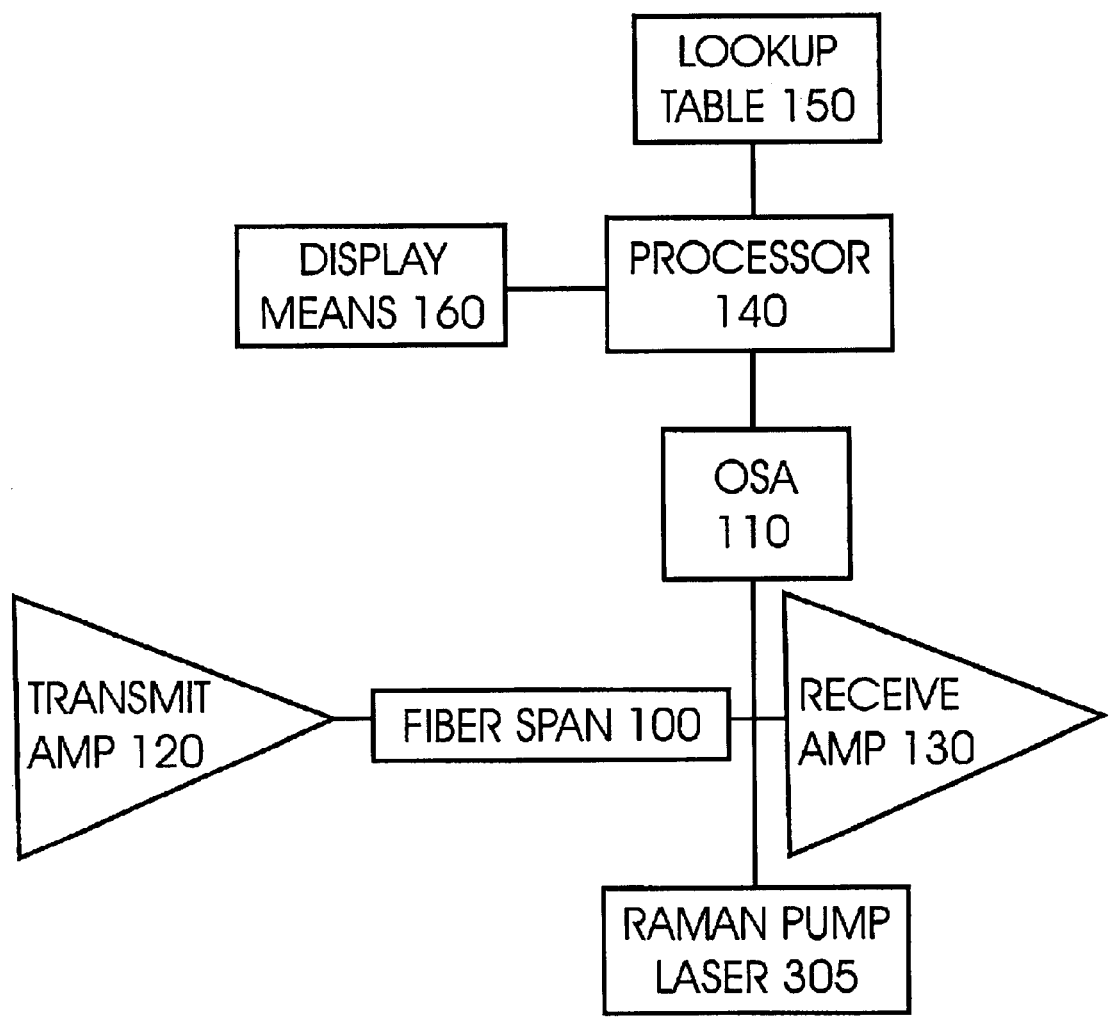
FIG. 3 illustrates diagrammatically a system for automatically identifying a fiber type according to another embodiment of the present invention.

FIG. 3 illustrates diagrammatically a system for automatically identifying a fiber type according to another embodiment of the present invention. This second embodiment involves the use of measured and known Raman gain profiles.

Similar to the system and method of the first embodiment, the pumps at the transmit amplifier 120 are turned up to deliver high-power Amplified Spontaneous Emission (ASE) throughput. A profile, $P3(\lambda)$, at a receive amplifier 130 is measured at the appropriate OSA 110.

However, in this second embodiment, a Raman pump laser 305 is then applied onto the system. The application of the Raman pump laser 305 produces a Raman gain, resulting in an increase in the value of the receive amplifier profile, defined as $P3'(\lambda)$. The Raman gain profile, $G1(\lambda)$, is defined by the change in receive amplifier profile before and after the application of the Raman pump. In other words:

$$G1(\lambda)=P3'(\lambda)-P3(\lambda)$$

In this second embodiment, the Raman Gain profile, $G1(\lambda)$, is used instead of the span loss profile, $L2(\lambda)$, in order to perform a comparison based on the measured score. Therefore, as in the first embodiment, a predefined window of wavelengths can be statistically interpreted and typical profiles for all supported fiber types will be gathered. Again, statistics on these fiber types will be scrutinized and weighting coefficients assigned to the statistical indicators to provide identification scores, which would be contained in lookup table 150. These scores would be used in the comparison step in order to identify the fiber type of an in-field measured span. Reference is made to the previous discussion of FIG. 2 in which the particularities of the comparison may be found. The result of this comparison may advantageously be displayed on a display means 160.

Therefore, it has been seen that a system and method employing a statistical score based on a span loss profile measurement technique according to the present invention may be used to automatically identify a fiber type. It has also been seen that a system and method employing a statistical score based on a Raman gain profile measurement technique according to the present invention may also be used to automatically identify a fiber type.

It is important to note, however, that the inability to match measured results against results in the lookup table for both the loss profile fiber identification method and for the Raman profile fiber identification method may indicate the existence of a mixed fiber-type within a span. If the score is between two fiber type indicators, it may imply that fibers of both of those types are present in the span being measured.

Furthermore, the present invention permits mapping of the fiber types for each span within a fiber link. Consequently, an auto mapping of a network is possible, based on each of these link mappings.

What is claimed is:

1. A method of automatically identifying a fiber type in an optically amplified fiber optic span, said span having connected thereto a transmit amplifier, and a receive amplifier, said method comprising the steps of:

obtaining a spectral power profile near each of said transmit amplifier and said receive amplifier;

determining a measured score for said fiber span based on a spectral loss profile for said fiber span; and comparing said measured score with known identification scores in a lookup table in order to facilitate a positive determination of the fiber type for the fiber span if said measured score matches a score in the table within a given tolerance.

2. A method according to claim 1 wherein the measured score being outside the given tolerance is interpreted as identifying the presence of multiple fiber types within the span.

3. A method according to claim 1 wherein said spectral loss profile is calculated by subtracting the spectral profile of said transmit amplifier from the spectral profile of said receive amplifier.

4. A method according to claim 1 further comprising, before said step of comparing:

calculating a known identification score for each of a plurality of fiber types; and entering the known identification scores in the look up table.

5. A method according to claim 4 wherein said step of calculating a known identification score comprises:

focusing said spectral loss profile across a pre-defined window of wavelengths;

scaling said spectral loss profile with respect to a pre-defined value to produce a normalized distribution;

calculating statistical values based on the normalized distribution; and summing weighted values of said statistical values.

6. A method according to claim 1 further comprising the steps of:

mapping the fiber types for each span within a fiber link; and automatically mapping a network based on the mapping of each link in the network.

7. A method of automatically identifying a fiber type in an optically amplified fiber optic span, said span having connected thereto a transmit amplifier, and a receive amplifier, said method comprising the steps of:

obtaining a first spectral profile near said receive amplifier;

applying a Raman pump laser to said system;

obtaining a second spectral profile near said receive amplifier after said step of applying the Raman pump laser;

determining a score for said fiber span based on a Raman gain profile for said fiber span; and comparing said score with known identification scores in a lookup table in order to make a positive determination of the fiber type for the fiber span if the measured score matches a score in the table within a given tolerance.

8. A method according to claim 7 wherein the measured score being outside the given tolerance is interpreted as identifying the presence of multiple fiber types within the span.

9. A method according to claim 7 wherein said Raman gain profile is calculated by subtracting the first spectral profile near said receive amplifier from the second spectral profile near said receive amplifier.

10. A method according to claim 7 further comprising, before said step of comparing:

calculating a known identification score for each of a plurality of fiber types; and entering the known identification scores in the look up table.

11. A method according to claim 10 wherein said step of calculating a known identification score comprises:

focusing said Raman gain profile across a predefined window of wavelengths;

scaling said Raman gain profile with respect to a predefined value to produce a normalized distribution;

calculating statistical values based on the normalized distribution; and summing weighted values of said statistical values.

12. A method according to claim 7 further comprising the steps of:

mapping the fiber types for each span within a fiber link; and automatically mapping a network based on the mapping of each link in the network.

13. A fiber type identification system for automatically identifying a fiber type in an optically amplifiable fiber optic span comprising:

one or more optical spectrum analyzers for measuring a spectral profile near one or more amplifiers attached to said fiber optic span;

a lookup table of known identification scores for each of a plurality of fiber types; and means for calculating a score for a span based on said profile measurements; and means for comparing said score to the known identification scores in the lookup table in conjunction with a given tolerance in order to identify the fiber type of the span.

14. A system according to claim 13 further comprising a display means for displaying the result of the fiber type identification.

15. A system according to claim 13 wherein said score is a spectral loss profile.

16. A system according to claim 13 further comprising:

a Raman pump laser for applying a Raman amplification to said fiber optic span.

17. A system according to claim 16 wherein said optical spectrum analyzers measure a profile near said one or more amplifiers before and after the application of the Raman amplification.

18. A system according to claim 17 wherein the score calculated by said processor is a Raman gain profile that takes into account both sets of measured profiles.

\* \* \* \* \*